US007234717B1

(12) United States Patent
Thomas

(10) Patent No.: US 7,234,717 B1
(45) Date of Patent: Jun. 26, 2007

(54) GRIP ATTACHMENT FOR WHEELCHAIR RIM

(76) Inventor: Erik Trevor Thomas, 12366 Corporal Cir., Port Charlotte, FL (US) 33953

(*) Notice: Subject to any disclaimer, the term of this patent is extended or adjusted under 35 U.S.C. 154(b) by 26 days.

(21) Appl. No.: 11/154,038

(22) Filed: Jun. 16, 2005

(51) Int. Cl.
*B62M 1/14* (2006.01)

(52) U.S. Cl. ............................... 280/250.1; 280/304.1; 403/289; 403/290

(58) Field of Classification Search ............. 280/250.1, 280/304.1; 403/289, 290
See application file for complete search history.

(56) References Cited

U.S. PATENT DOCUMENTS 3,623,748 A 11/1971 Haynes
3,869,146 A * 3/1975 Bulmer .................... 280/250.1
4,039,199 A * 8/1977 Quinby .................... 280/250.1
4,354,691 A * 10/1982 Saunders et al. ........ 280/250.1
5,037,120 A 8/1991 Parisi
5,988,661 A 11/1999 Garfinkle
6,241,268 B1 * 6/2001 Niklasson ................ 280/250.1

* cited by examiner

*Primary Examiner*—Lesley D. Morris
*Assistant Examiner*—Marlon Arce-Diaz
(74) *Attorney, Agent, or Firm*—Charles J. Prescott

(57) ABSTRACT

For a manually propelled wheelchair having a rear wheel located on either side of the wheelchair, each rear wheel including an annular or round push rim of substantially uniform, uninterrupted cross section, a grip attachment attachable to the rim used by an occupant of the wheelchair to propel the wheelchair. The grip attachment includes a gripping body having a preferably convex palm-pushing surface on a posterior side thereof and a preferably concave finger-pulling surface on an anterior side thereof. A rim-engaging member having an annular or circular-shaped attached to each rear wheel is adapted to cooperate with the gripping body to clampingly secure the gripping body to the rim in a laterally outwardly extending orientation. By this arrangement, an occupant may propel the wheelchair forwardly by exerting palm pressure against the posterior side and rearwardly by exerting finger pressure against the anterior side. Preferably, a plurality of grip attachments are installed in evenly spaced orientation around each rim.

4 Claims, 4 Drawing Sheets

FIG 1
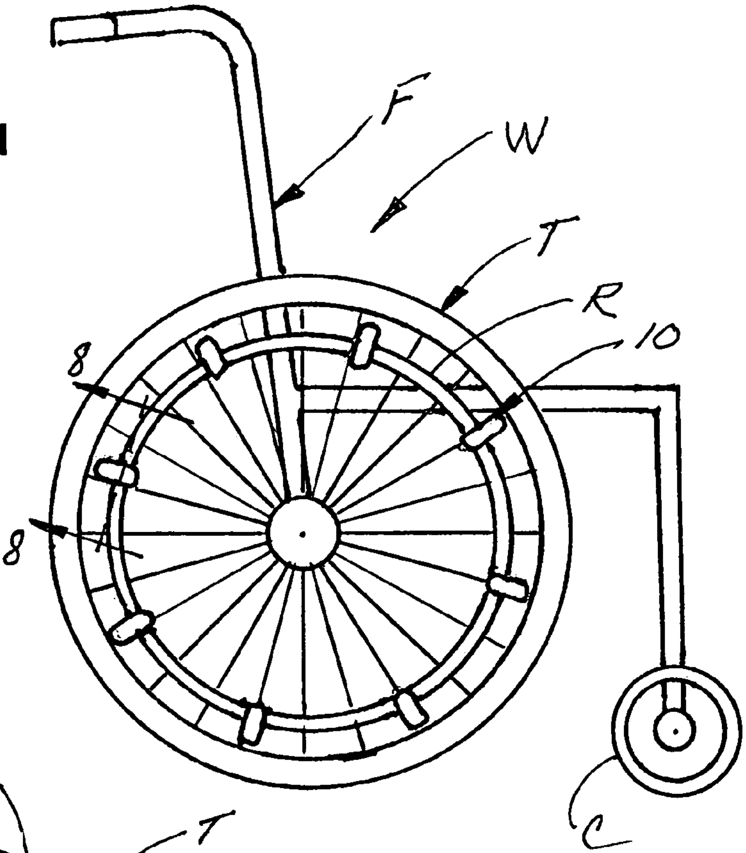
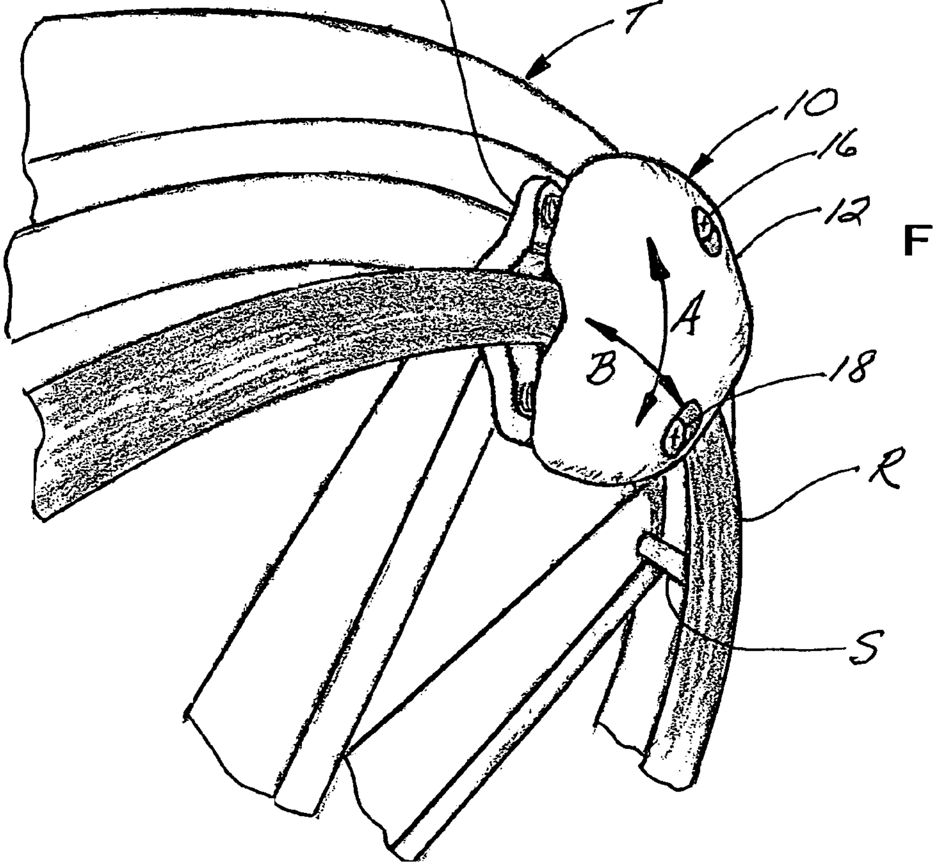
FIG 2

GRIP ATTACHMENT FOR WHEELCHAIR RIM

BACKGROUND OF THE INVENTION

1. Field of the Invention

This invention relates generally to wheelchairs, and more particularly to a grip attachment for a manually propelled wheelchair which greatly enhances the ease by which an occupant may propel the wheelchair.

2. Description of Related Art

Manual wheelchairs of the rigid or foldable type generally include a circular hand rim attached to each rear wheel which is intended for manual grasping by the occupant for wheelchair propulsion either forwardly or rearwardly. Where the occupant has full use of the hands, such wheelchair propulsion is relatively easy and may be enhanced by a friction coating on the rim for enhanced gripability. However, where the occupant is aged or has hand or nerve impairment which substantially reduces the ability to grasp conventional rims, manual propulsion of the wheelchair is, at best, difficult and for some users, impossible.

Prior art teaches a limited selection of devices included in manual wheelchair rear wheels and rims which facilitate manual propulsion for occupants with limited hand or arm function. In U.S. Pat. No. 4,039,199, Quinby teaches a wheelchair push rod apparatus for manually propelling a wheelchair by an occupant using a knob attached to each push rod and radially extending therefrom. Each push rod also automatically retracts to avoid contact with the ground as each rear wheel is rotated.

Haynes teaches a device for engaging and pushing forwardly on a driving element for a wheelchair in U.S. Pat. No. 3,623,748. Garfinkle teaches a drive assistance device for wheelchairs in U.S. Pat. No. 5,988,661 and Niklasson teaches a wheelchair friction drive ring in U.S. Pat. No. 6,241,268.

Other patents of interest are listed herebelow:

U.S. Pat. No. 5,037,120 to Parisi

U.S. Pat. No. 6,276,705 to Baldwin, et al.

U.S. Pat. No. 4,366,964 to Farey, et al.

U.S. Pat. No. 3,226,128 to Grier, Jr.

U.S. Pat. No. 3,189,368 to Petersen

BRIEF SUMMARY OF THE INVENTION

This invention is directed to a manually propelled wheelchair having a rear wheel located on either side of said wheelchair, each rear wheel including an annular or round push rim of substantially uniform, uninterrupted cross section, a grip attachment, when attached to the rim used by an occupant of the wheelchair to propel the wheelchair. The grip attachment includes a gripping body having a preferably convex palm-pushing surface on a posterior side thereof and a preferably concave finger-pulling surface on an anterior side thereof. A rim-engaging member is adapted to cooperate with the gripping body to clampingly secure said gripping body to the rim in a laterally outwardly extending orientation whereby an occupant may propel the wheelchair forwardly by exerting palm pressure against the posterior side and rearwardly by exerting finger pressure against the anterior side. Preferably, a plurality of grip attachments are installed in evenly spaced orientation around each rim.

It is therefore an object of this invention to provide an easily installable grip attachment for the rear wheels of a manually propelled wheelchair for enhanced occupant mobility.

Still another object of this invention is to provide a grip attachment for the rear wheels of a manually propelled wheelchair which is compatible with a wide variety of wheelchairs having existing annular rims for attachment thereto.

Yet another object of this invention is to provide a grip attachment for manually propelled wheelchairs which requires no new skills learning or sequencing by the occupant.

Still another object of this invention is to provide a grip attachment for manually propelled wheelchair which is more ergonomically appropriate for the arthritic/geriatric hand posture while an occupant manually propels the wheelchair both forwardly and rearwardly.

Yet another object of this invention is to provide a grip attachment for attachment to a rim of each rear wheel of a manually propelled wheelchair which affords greater durability and reliability in the invention's static attachment and use to decrease the likelihood of wear and component failure.

In accordance with these and other objects which will become apparent hereinafter, the instant invention will now be described with reference to the accompanying drawings.

BRIEF DESCRIPTION OF THE SEVERAL VIEWS OF THE DRAWING(S)

DETAILED DESCRIPTION OF THE INVENTION

Figure 1:
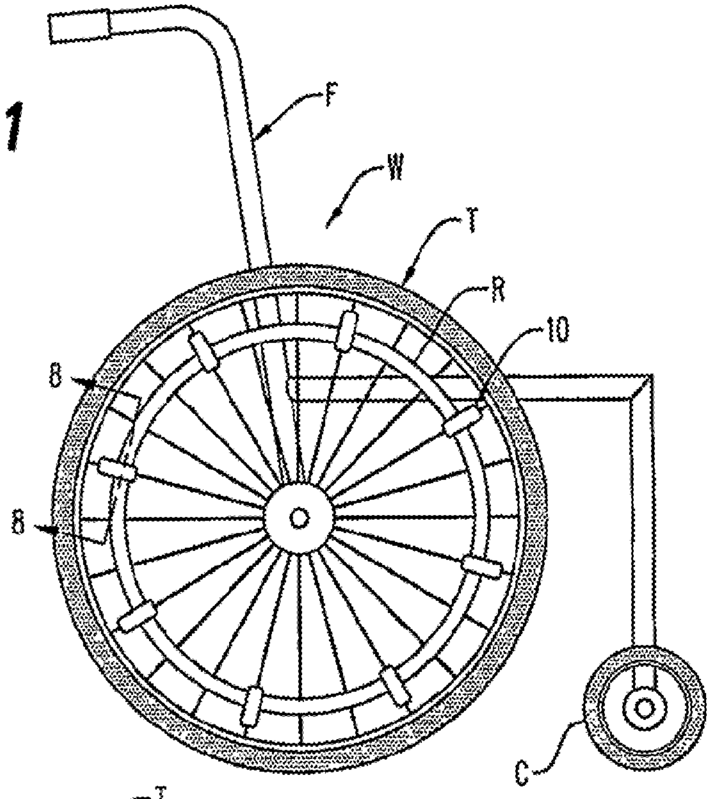
FIG. 1 is a side elevation view in schematic of a conventional manually propelled wheelchair with the invention installed thereon.
Figure 2:
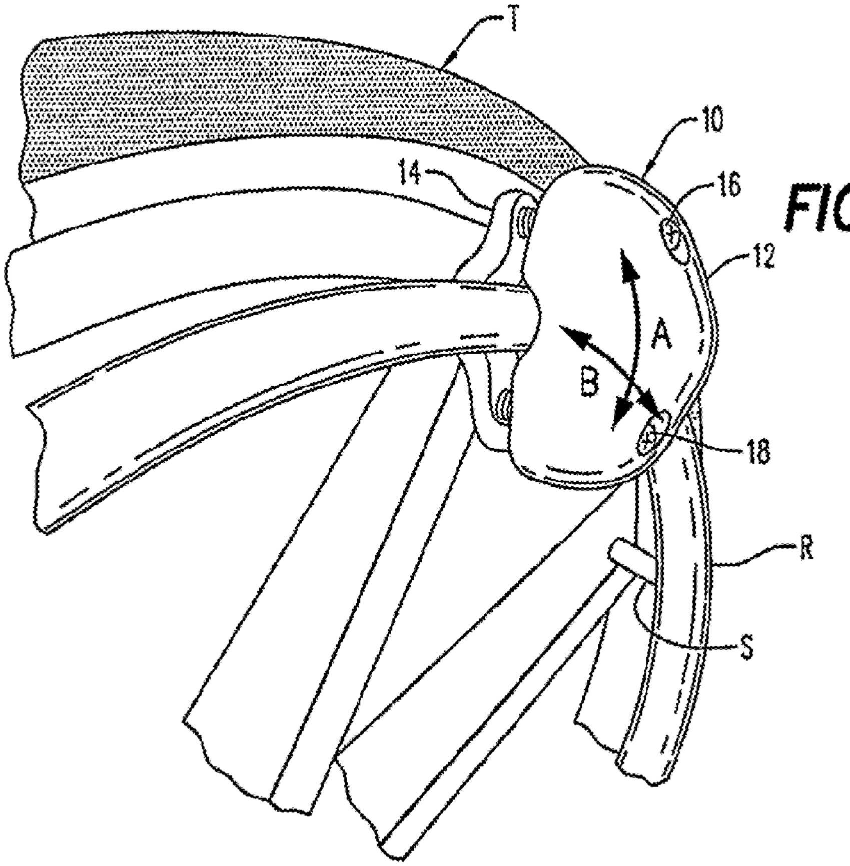
FIG. 2 is an enlarged perspective view of a portion of one rear wheel of the wheelchair of FIG. 1.
Figure 3:
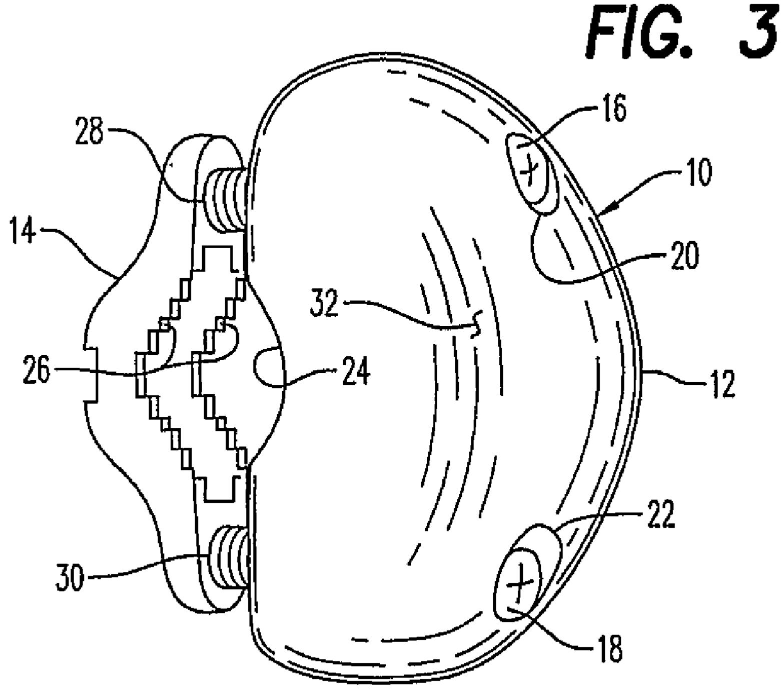
Figure 4:
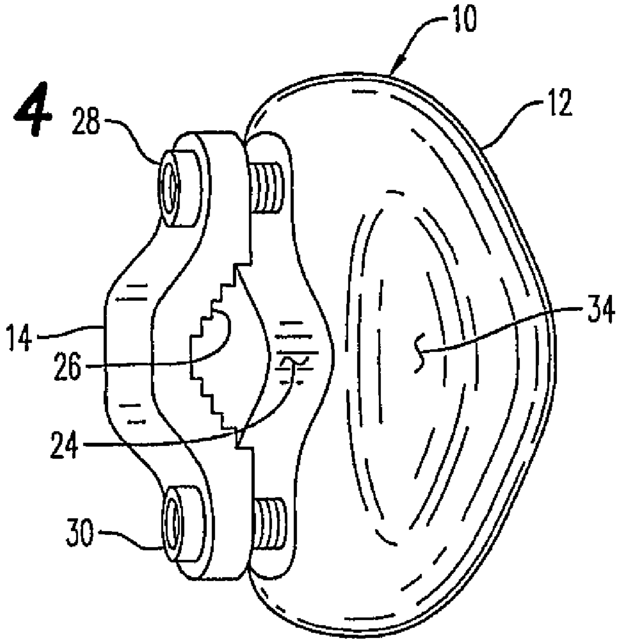
Figure 5:
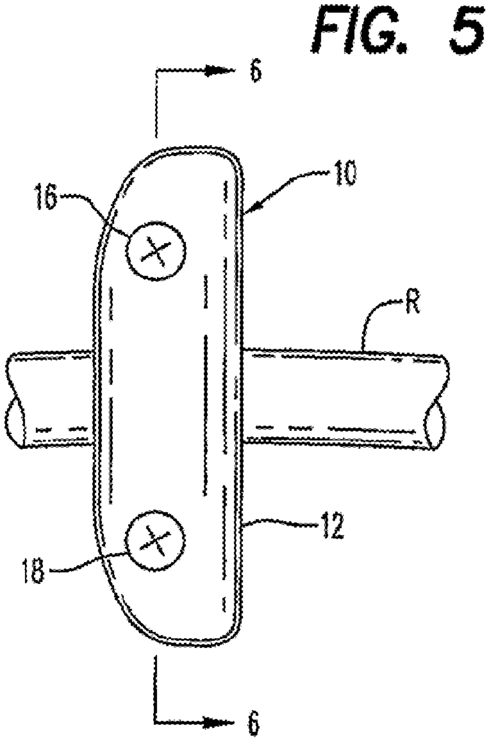
Figure 6:
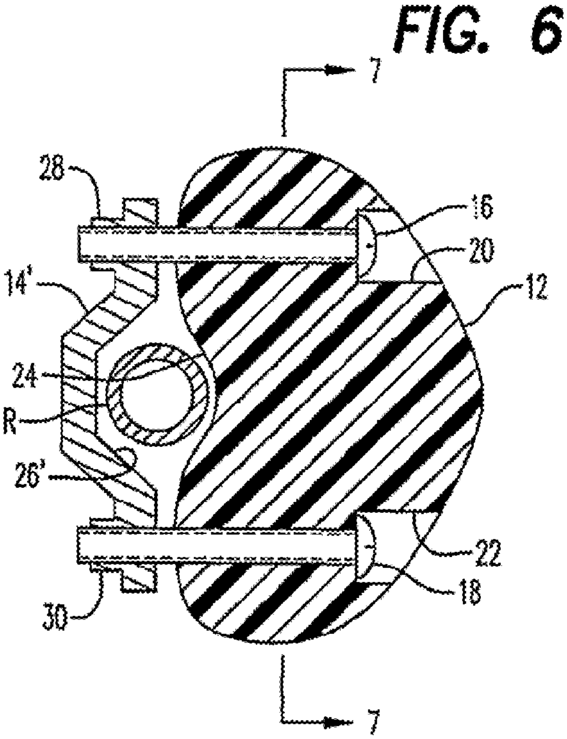
Figure 7:
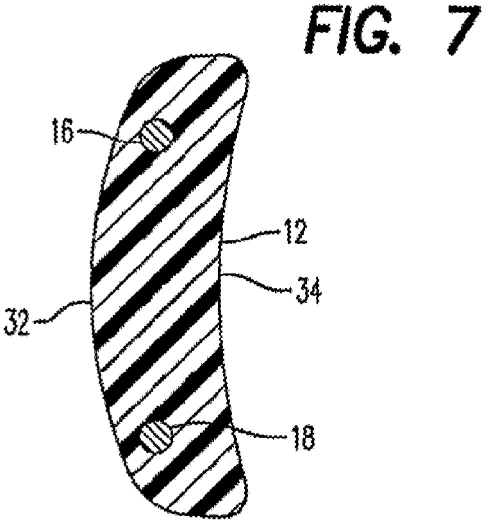
Figure 8:
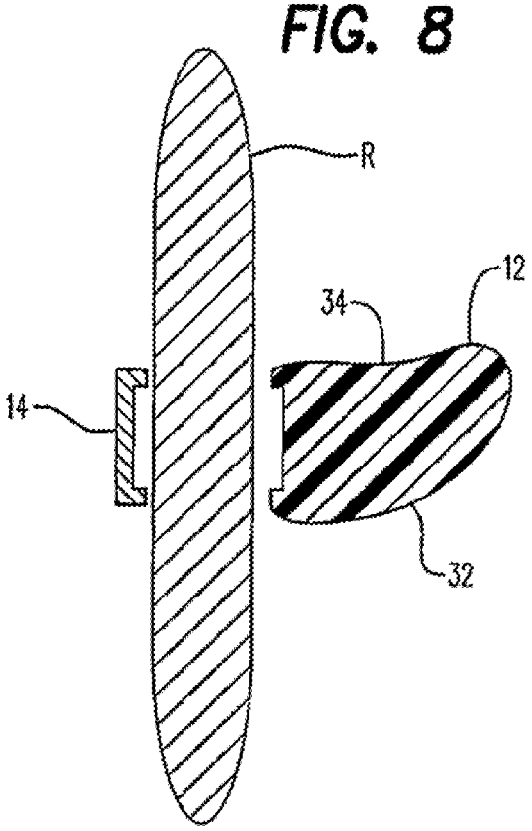
Figure 9:
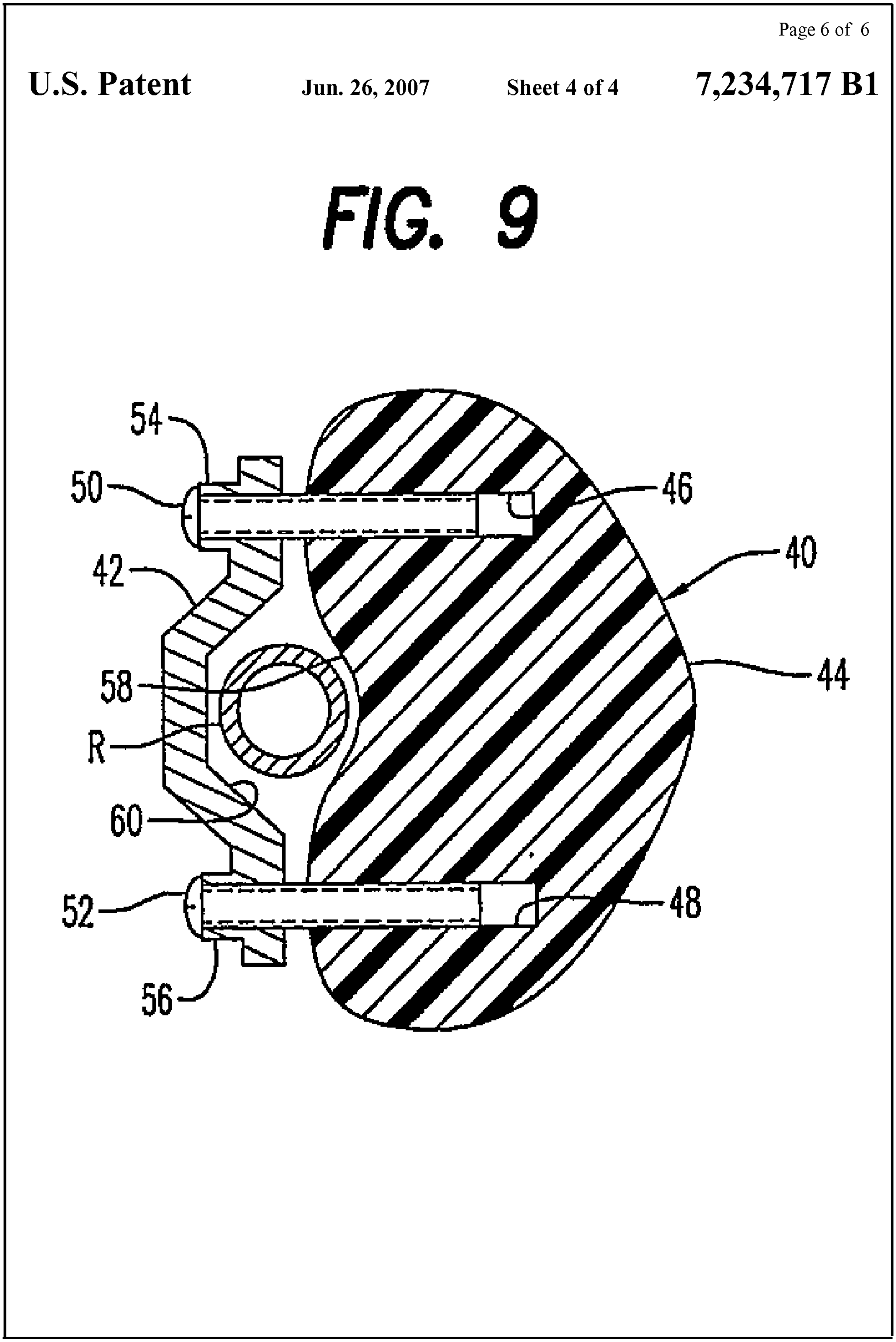
Figure 1:
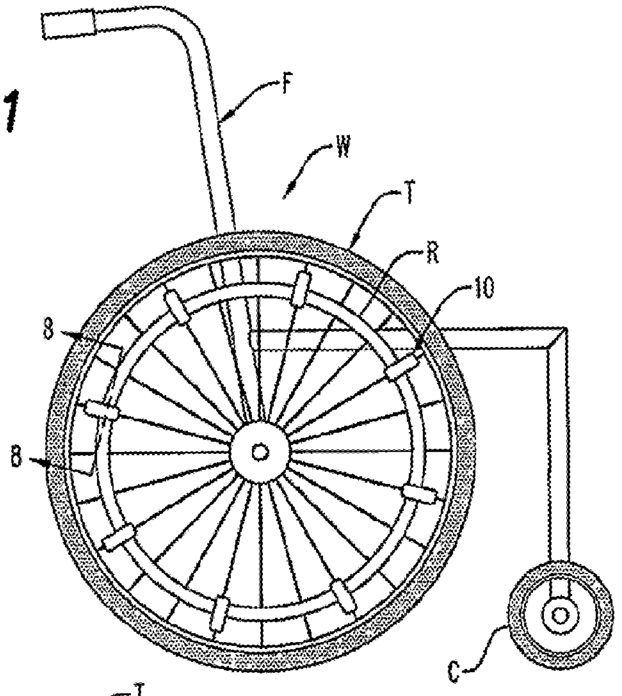
Figure 2:
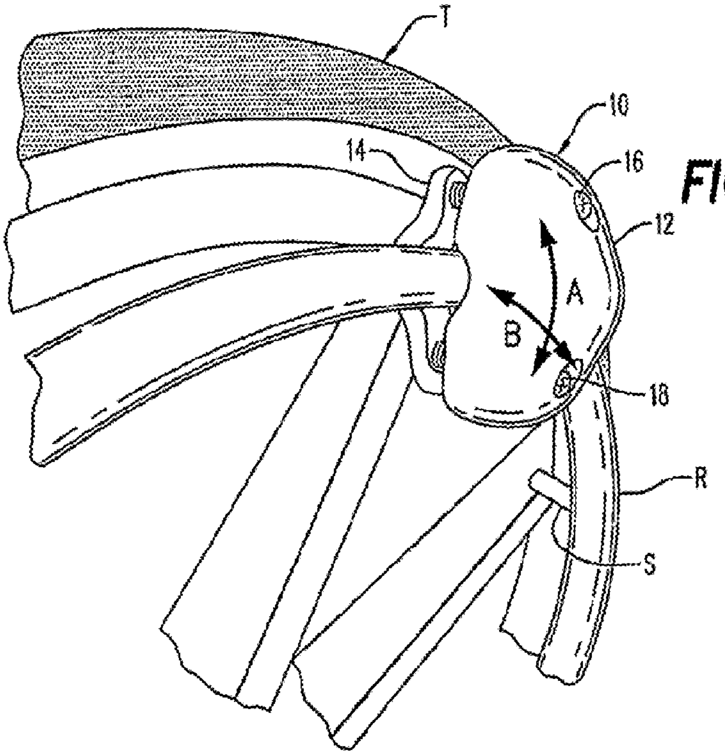
Figure 3:
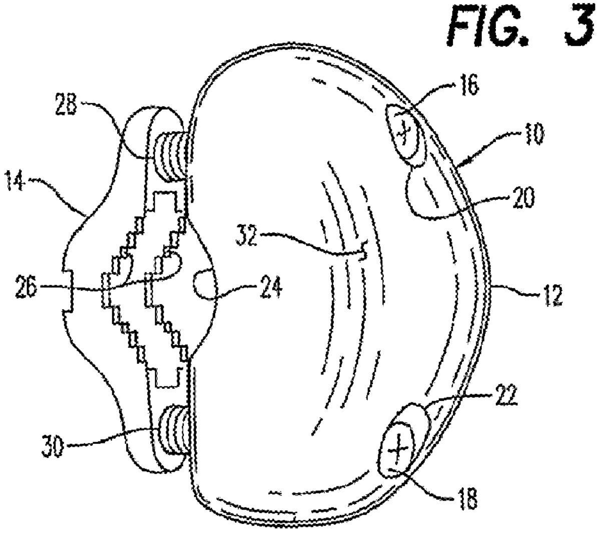
Figure 4:
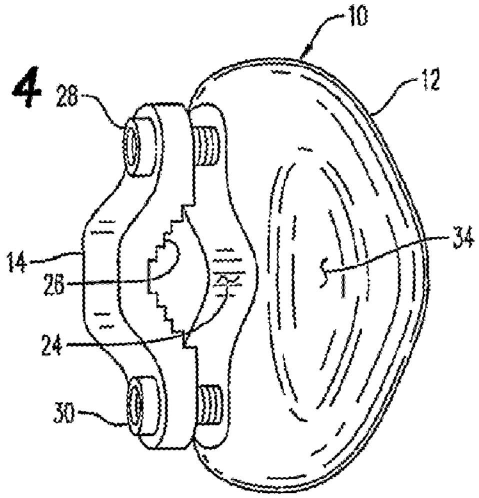
Figure 5:
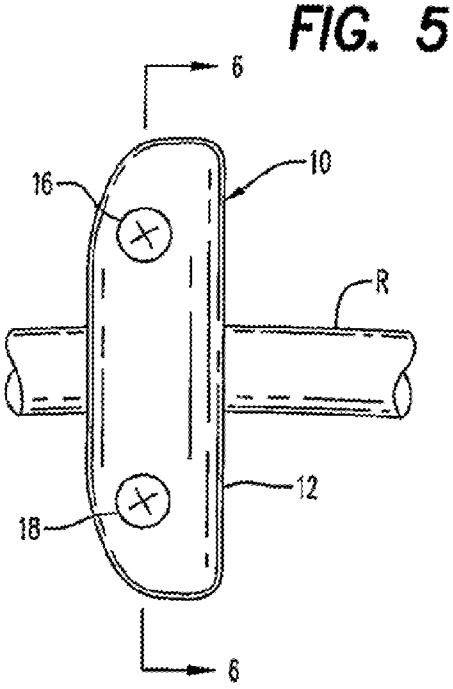
Figure 6:
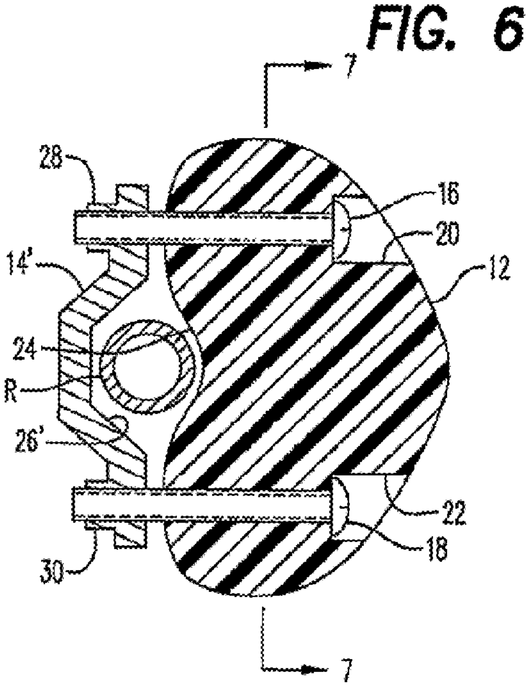
Figure 7:
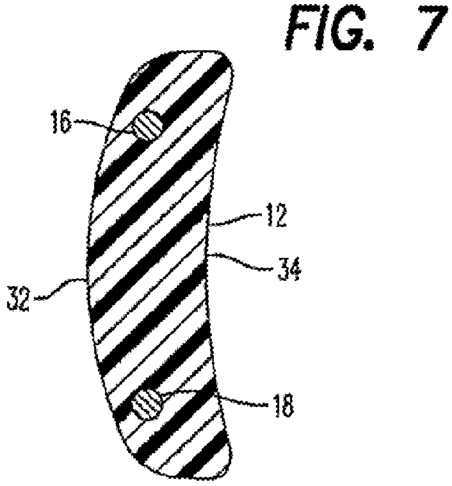
Figure 8:
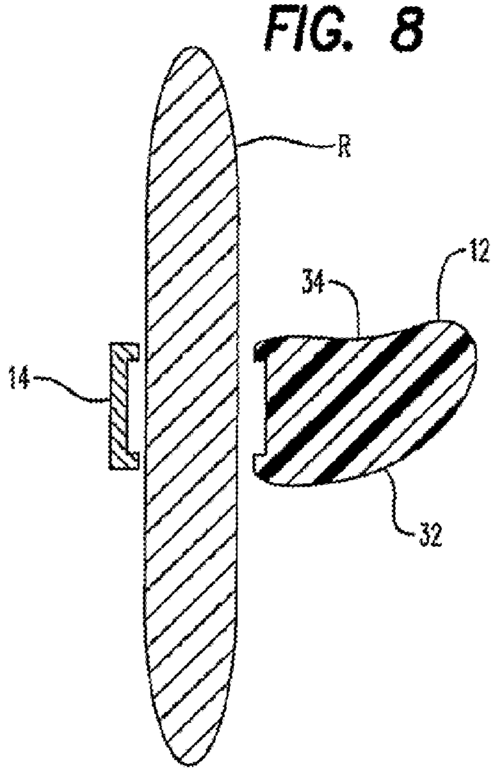
Figure 9:
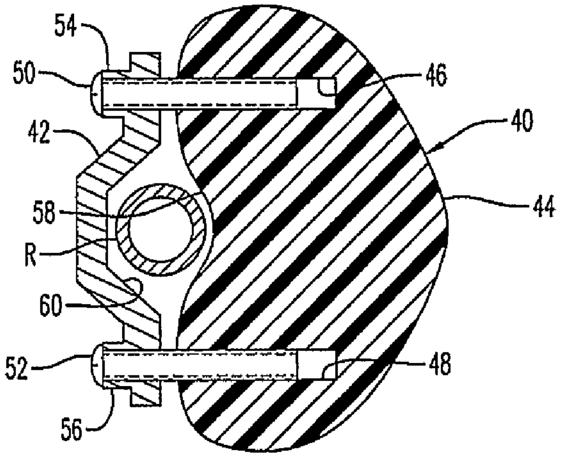

Referring now to the drawings, a conventional manually propelled wheelchair is shown in simplified or schematic view at W in FIG. 1. This wheelchair W includes a frame F supporting rear wheels T on either side of the frame F and front casters for steerability and body support in combination with the rear wheel T for supporting a seated occupant.

Each rear wheel T includes an annular or circular hand rim R which is typically formed having a uniform tubular or round cross section and being smooth and uninterrupted for hand-grasping for manual propulsion of the wheelchair W. The rim R is held in outboard spaced relationship to the wheel T by spacers S and hidden mechanical fasteners (not shown).

The invention is generally shown at numeral 10 in FIG. 1 and as also seen in FIGS. 2 to 8. At least one and preferably a plurality of, evenly spaced grip attachments 10 are mechanically attachable in the desired radial spacing and rotational orientation of the device 10 with respect to the rim R. Each grip attachment 10 is formed having a gripping body 12 formed of preferably molded plastic material and a rigid rim-engaging member 14 which cooperatively acts with the gripping body 12 and elongated threaded fasteners 16 and 18 which threadably engage into threaded female threads 28 and 30 formed in spaced alignment with the longitudinal transverse passages 20 and 22 formed through the gripping body 12. Once the grip attachment 10 is loosely assembled around the rim R, rotational and radial adjustment in the direction of arrows A and B, respectively shown in FIG. 2, may be made for optimal adjustment after which the threaded fasteners 16 and 18 are tightened to secure the desired orientation.

To enhance gripability of the device 10 on rim R, teeth at 26 formed on the inner margins of the rim-engaging member 14 are provided to dig into the rim R when the fasteners 16 and 18 are tightened. Additionally, the mating surface 24 of the gripping body 12 is arcuately conformed to mate against a wide variety of rim diameters.

Figure 3:
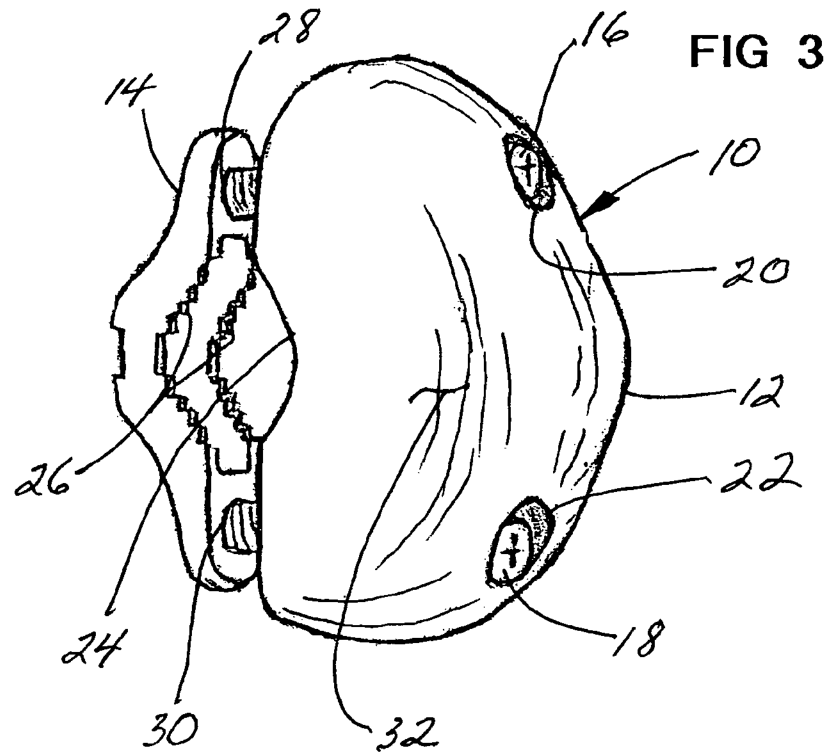
FIG. 3 is a perspective view of the posterior surface of the invention.
Figure 4:
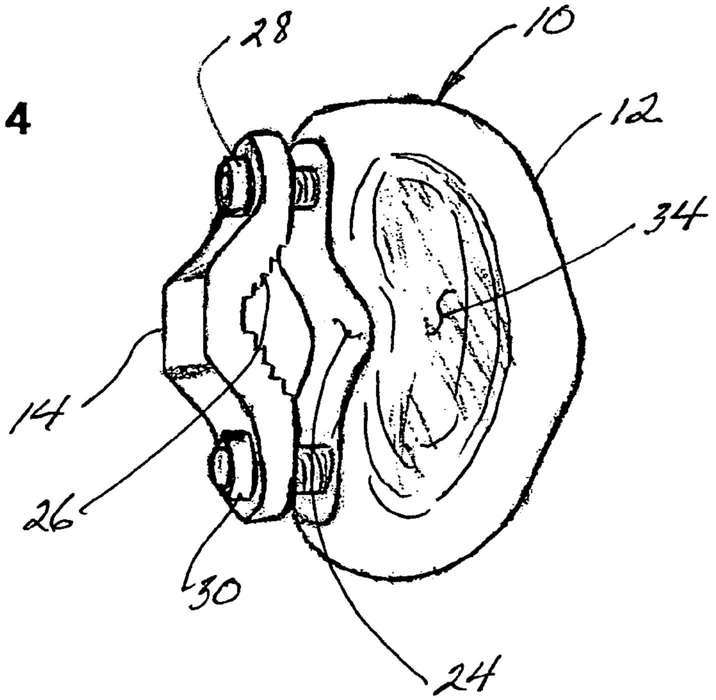
FIG. 4 is a perspective view of the anterior side surface of the invention.
Figure 5:
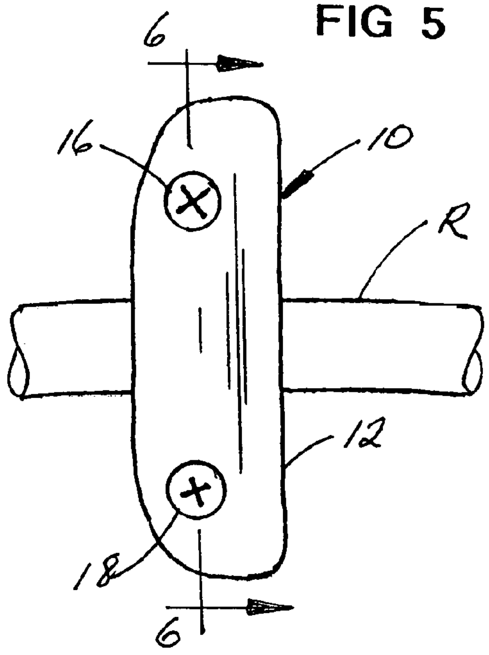
FIG. 5 is an outside elevation view of the invention of FIG. 1.
Figure 7:
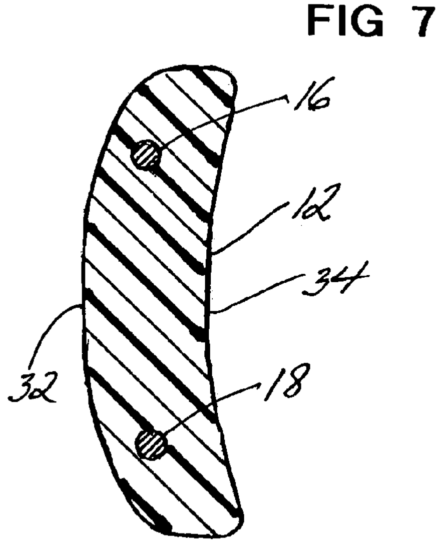
FIG. 7 is a section view in the direction of arrows 7—7 in FIG. 6.
Figure 8:
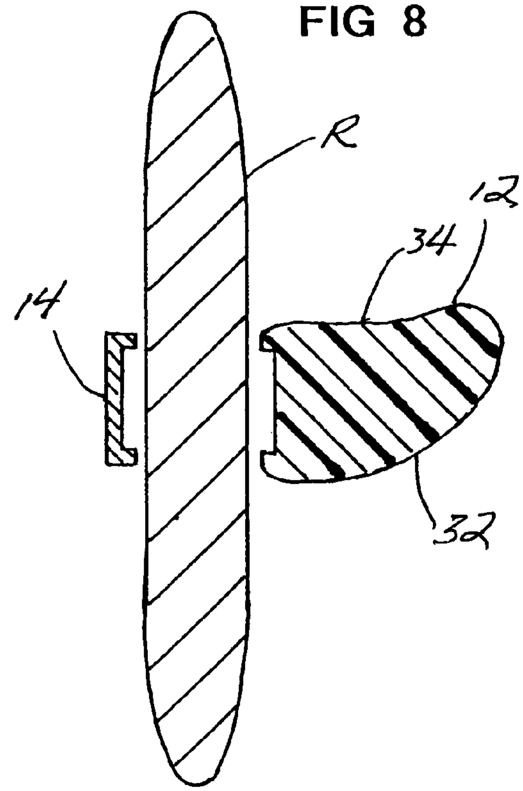
FIG. 8 is a section view in the direction of arrows 8—8 of FIG. 1.

The gripping body 12 is ergonomically designed so as to preferably have a convex posterior palm-pushing surface 32 which better conforms to the concavity of the palm of the occupant. The anterior surface 34 best seen in FIGS. 4, 7 and 8, is concaved so as to accept the fingertips of the occupant when a reverse or rearward motion of the wheelchair is desired.

Figure 6:
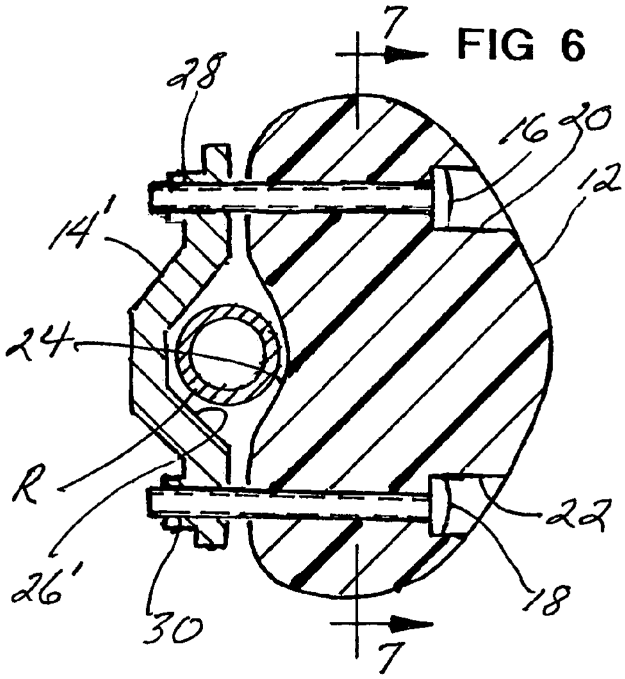
FIG. 6 is a section view in the direction of arrows 6—6 in FIG. 5.

As best seen in FIG. 6, the threaded fasteners 16 and 18 are provided enlarged driving head access in cavities 20 and 22 positioned on the outer surface of the gripping body 12. As previously described, the threaded fasteners 16 and 18 threadably engage into mating female threads 28 and 30 of the rim-engaging member 14' which is shown having a smooth surface 26' absent teeth should damage to the rim R be of concern.

Figure 9:
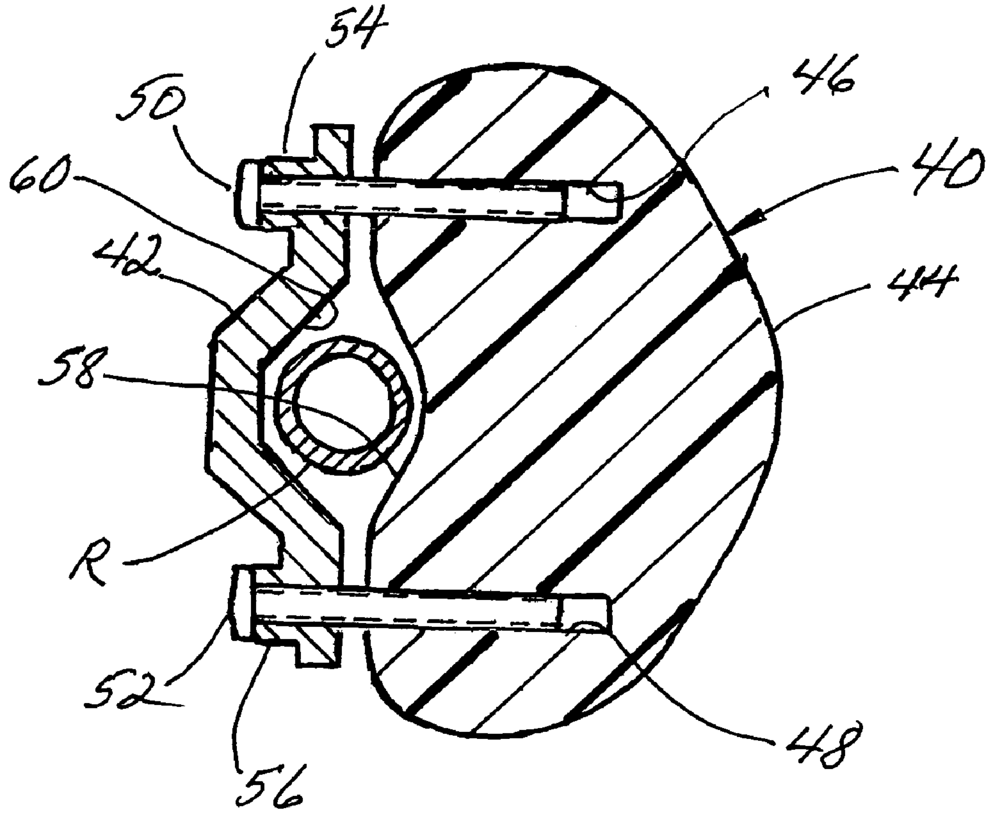
FIG. 9 is a view similar to FIG. 6 of an alternate embodiment of the invention.

In FIG. 9, an alternate or reverse thread arrangement is there shown wherein the elongated threaded fasteners 50 and 52 pass through and bear against enlarged unthreaded bosses 54 and 56 of the rim-engaging member 42 and are threadably engaged into threaded female holes 46 and 48 formed into the gripping body 44. The concaved inner surface 58 of the gripping body 44 cooperates with the concaved smooth surface 60 of the grip-engaging member 42 to clampingly surround the rim R to secure the grip attachment 40 in the desired rotational and radially positioned orientation on the rim R.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

The invention claimed is:

1. On a wheelchair having a rear wheel located on either side of said wheelchair, each said rear wheel including an annular push rim of substantially uniform, uninterrupted cross section, a plurality of grip attachments used by an occupant of said wheelchair to propel said wheelchair, each said grip attachment comprising:

a gripping body having a convex palm pushing surface and a concave finger-pulling surface;

a rim-engaging member connectable or connected with said gripping body to rigidly connect said gripping body to, and to be carried with, the rim in a laterally outwardly extending orientation whereby an occupant may propel the wheelchair forwardly by exerting palm pressure against said palm pushing surface and may move the wheelchair rearwardly by exerting finger pressure against said finger pulling surface.

2. A grip attachment used by an occupant of a wheelchair to propel the wheelchair, said grip attachment comprising:

a gripping body having a convex palm pushing surface and a concave finger-pulling surface;

a rim-engaging member rigidly attaching said gripping body to a circular push rim of each of two rear wheels, one rear wheel on each side of the wheelchair, said gripping body rigidly positionable on and rotating continuously with the rim in a laterally outwardly extending orientation whereby an occupant may propel the wheelchair forwardly by exerting palm pressure against said palm pushing surface and may move the wheelchair rearwardly by exerting finger pressure against said finger pulling surface.

3. On a wheelchair having a rear wheel located on either side of said wheelchair, each said rear wheel including an annular push rim of substantially uniform, uninterrupted cross section, a plurality of spaced grip attachments each of which may be attached to said rim in evenly spaced apart relation around the rim and used by an occupant of said wheelchair to propel said wheelchair, each said grip attachment comprising:

a gripping body having a palm pushing surface and a finger-pulling surface;

a rim-engaging member cooperating with said gripping body to rigidly attach said gripping body to the rim to be carried by and rotate with the rim in a laterally outwardly extending orientation whereby an occupant may propel the wheelchair forwardly by exerting palm pressure against said palm pushing surface and may move the wheelchair rearwardly by exerting finger pressure against said finger pulling surface.

4. A plurality of gripping attachments connectable in spaced relation around a conventional annular push rim of a rear wheel of a wheelchair, each of said gripping attachments comprising:

a gripping body having a convex palm pushing surface and a concave finger-pulling surface;

a rim-engaging member rigidly attaching said gripping body to a circular push rim of each of two rear wheels, one rear wheel on each side of the wheelchair, said gripping body rigidly positionable on and rotating continuously with the rim in a laterally outwardly extending orientation whereby an occupant may propel the wheelchair forwardly by exerting palm pressure against said palm pushing surface and may move the wheelchair rearwardly by exerting finger pressure against said finger pulling surface.

* * * * *

UNITED STATES PATENT AND TRADEMARK OFFICE

CERTIFICATE OF CORRECTION

PATENT NO. : 7,234,717 B1
APPLICATION NO. : 11/154038
DATED : June 26, 2007
INVENTOR(S) : Erik Trevor Thomas It is certified that error appears in the above-identified patent and that said Letters Patent is hereby corrected as shown below:

The title page illustrating figure(s) should be deleted and substituted therefor the attached title page illustrating figure(s).

Delete Drawing Sheets 1-4, and substitute therefore the Drawing Sheets 1-4, consisting of Figs. 1-9 as shown on the attached pages.

Signed and Sealed this

Twenty-first Day of August, 2007

JON W. DUDAS
*Director of the United States Patent and Trademark Office*

(12) United States Patent
Thomas

(10) Patent No.: US 7,234,717 B1
(45) Date of Patent: Jun. 26, 2007

(54) GRIP ATTACHMENT FOR WHEELCHAIR RIM

(76) Inventor: Erik Trevor Thomas, 12366 Corporal Cir., Port Charlotte, FL (US) 33953

(*) Notice: Subject to any disclaimer, the term of this patent is extended or adjusted under 35 U.S.C. 154(b) by 26 days.

(21) Appl. No.: 11/154,038

(22) Filed: Jun. 16, 2005

(51) Int. Cl.
*B62M 1/14* (2006.01)

(52) U.S. Cl. .......................... 280/250.1; 280/304.1; 403/289; 403/290

(58) Field of Classification Search .......... 280/250.1, 280/304.1; 403/289, 290
See application file for complete search history.

(56) References Cited

U.S. PATENT DOCUMENTS 3,623,748 A 11/1971 Hayes
3,869,146 A * 3/1975 Bulmer .................... 280/250.1
4,030,199 A * 8/1977 Quisby .................... 280/250.1
4,354,691 A * 10/1982 Saunders et al. ........ 280/250.1
5,037,120 A 8/1991 Parisi
5,988,661 A 11/1999 Garfinkle
6,241,268 B1 * 6/2001 Nilsson ............... 280/250.1

* cited by examiner

*Primary Examiner*—Lesley D. Morris
*Assistant Examiner*—Marlon Arce-Diaz
(74) *Attorney, Agent, or Firm*—Charles J. Prescott

(57) ABSTRACT

For a manually propelled wheelchair having a rear wheel located on either side of the wheelchair, each rear wheel including an annular or round push rim of substantially uniform, uninterrupted cross section, a grip attachment attachable to the rim used by an occupant of the wheelchair to propel the wheelchair. The grip attachment includes a gripping body having a preferably convex palm-pushing surface on a posterior side thereof and a preferably concave finger-pulling surface on an anterior side thereof. A rim-engaging member having an annular or circular-shaped attached to each rear wheel is adapted to cooperate with the gripping body to clampingly secure the gripping body to the rim in a laterally outwardly extending orientation. By this arrangement, an occupant may propel the wheelchair forwardly by exerting palm pressure against the posterior side and rearwardly by exerting finger pressure against the anterior side. Preferably, a plurality of grip attachments are installed in evenly spaced orientation around each rim.

4 Claims, 4 Drawing Sheets

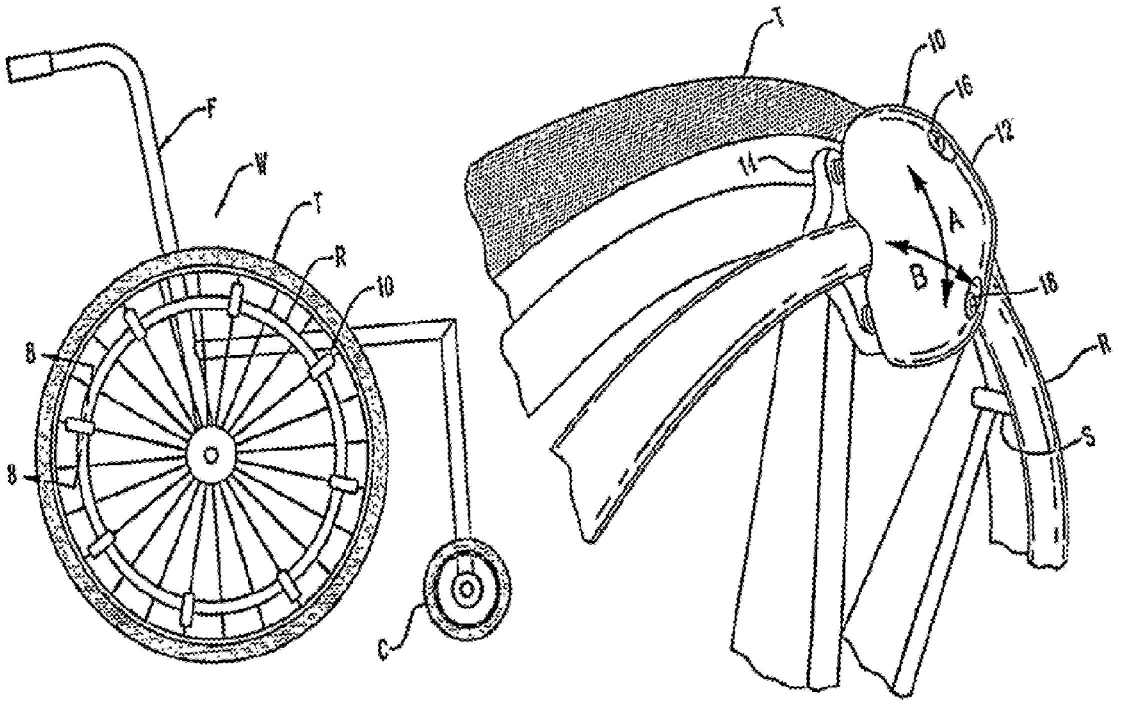

UNITED STATES PATENT AND TRADEMARK OFFICE

CERTIFICATE OF CORRECTION

PATENT NO. : 7,234,717 B1
APPLICATION NO. : 11/154038
DATED : June 26, 2007
INVENTOR(S) : Erik Trevor Thomas It is certified that error appears in the above-identified patent and that said Letters Patent is hereby corrected as shown below:

The title page should be deleted and substitute therefor the attached title page.

Drawings:

Delete Drawing Sheets 1-4, and substitute therefor the Drawing Sheets 1-4, consisting of Figs. 1-9 as shown on the attached pages.

Signed and Sealed this

Eleventh Day of September, 2007

JON W. DUDAS
*Director of the United States Patent and Trademark Office*

(12) United States Patent
Thomas

(10) Patent No.: US 7,234,717 B1
(45) Date of Patent: Jun. 26, 2007

(54) GRIP ATTACHMENT FOR WHEELCHAIR RIM

(76) Inventor: Erik Trevor Thomas, 12366 Corporal Cir., Port Charlotte, FL (US) 33953

(*) Notice: Subject to any disclaimer, the term of this patent is extended or adjusted under 35 U.S.C. 154(b) by 26 days.

(21) Appl. No.: 11/154,038

(22) Filed: Jun. 16, 2005

(51) Int. Cl.
*B62M 1/14* (2006.01)

(52) U.S. Cl. .......................... 280/250.1; 280/304.1; 403/289; 403/290

(58) Field of Classification Search .......... 280/250.1, 280/304.1; 403/289, 290
See application file for complete search history.

(56) References Cited

U.S. PATENT DOCUMENTS

| | | | | |
|---|---|---|---|---|
| 3,623,748 A | | 11/1971 | Haynes | |
| 3,869,146 A | * | 3/1975 | Bulmer | 280/250.1 |
| 4,039,199 A | * | 8/1977 | Quinby | 280/250.1 |
| 4,354,691 A | * | 10/1982 | Saunders et al. | 280/250.1 |
| 5,037,120 A | | 8/1991 | Parisi | |
| 5,988,661 A | | 11/1999 | Garfinkle | |
| 6,241,268 B1 | * | 6/2001 | Niklasson | 280/250.1 |

* cited by examiner

*Primary Examiner*—Lesley D. Morris
*Assistant Examiner*—Marlon Arce-Diaz
(74) *Attorney, Agent, or Firm*—Charles J. Prescott

(57) ABSTRACT

For a manually propelled wheelchair having a rear wheel located on either side of the wheelchair, each rear wheel including an annular or round push rim of substantially uniform, uninterrupted cross section, a grip attachment attachable to the rim used by an occupant of the wheelchair to propel the wheelchair. The grip attachment includes a gripping body having a preferably convex palm-pushing surface on a posterior side thereof and a preferably concave finger-pulling surface on an anterior side thereof. A rim-engaging member having an annular or circular-shaped attached to each rear wheel is adapted to cooperate with the gripping body to clampingly secure the gripping body to the rim in a laterally outwardly extending orientation. By this arrangement, an occupant may propel the wheelchair forwardly by exerting palm pressure against the posterior side and rearwardly by exerting finger pressure against the anterior side. Preferably, a plurality of grip attachments are installed in evenly spaced orientation around each rim.

4 Claims, 4 Drawing Sheets

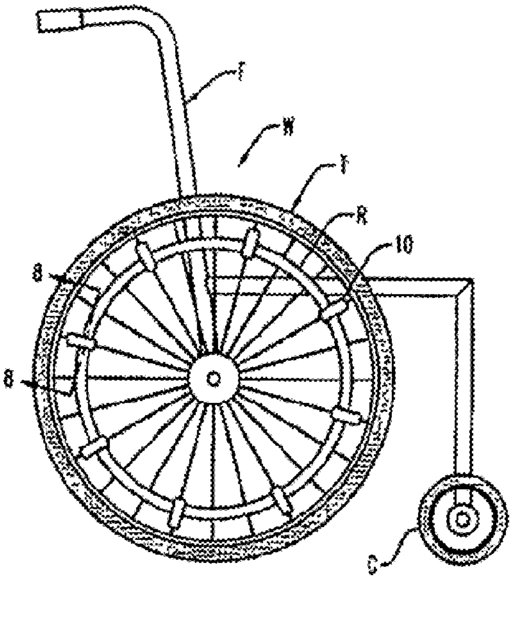

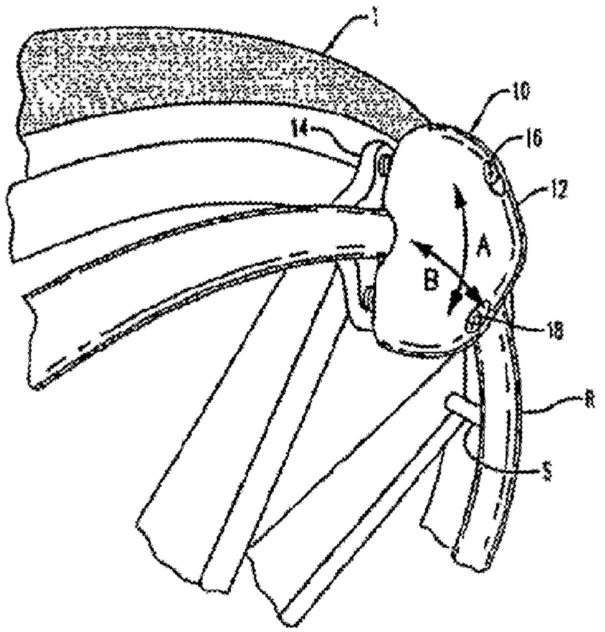

U.S. Patent Jun. 26, 2007 Sheet 3 of 4 7,234,717 B1